L. J. ADAMS & J. H. ESALE.
GRAIN MOISTENER.
No. 81,861.
Patented Sept. 8, 1868.
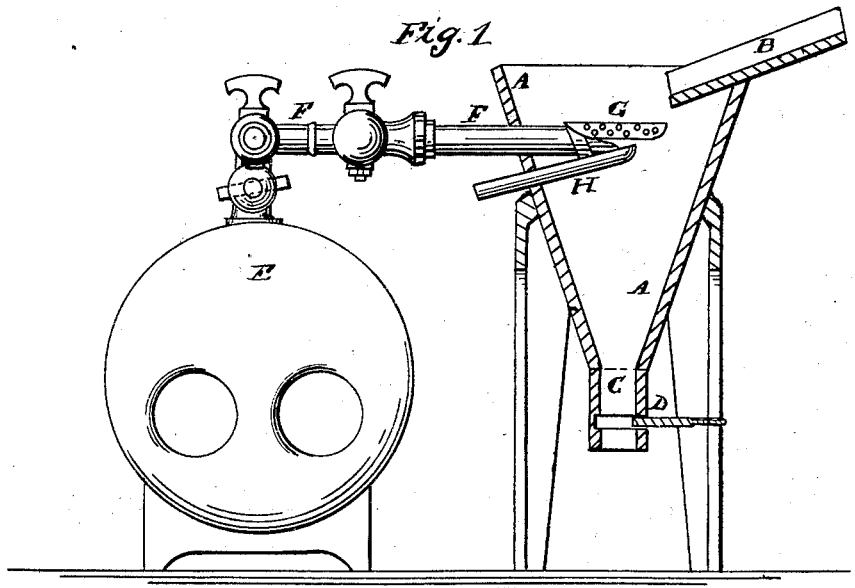
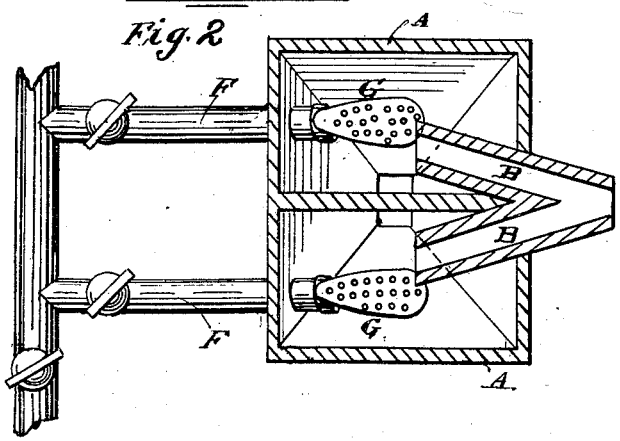

United States Patent Office.

L. J. ADAMS AND J. H. ESALE, OF AVON, ILLINOIS

Letters Patent No. 81,861, dated September 8, 1868.

IMPROVED GRAIN-MOISTENER.

*The Schedule referred to in these Letters Patent and making part of the same.*

TO ALL WHOM IT MAY CONCERN:

Be it known that we, L. J. ADAMS and J. H. ESALE, of Avon, in the county of Fulton, and State of Illinois, have invented a new and useful Improvement in Grain-Moisteners; and we do hereby declare that the following is a full, clear, and exact description thereof, which will enable others skilled in the art to make and use the same, reference being had to the accompanying drawings, forming part of this specification, in which—

Figure 1 is a vertical detail sectional view, illustrating our improvement.

Figure 2 is a top view of the same.

Similar letters of reference indicate corresponding parts.

Our invention has for its object to moisten and toughen the bran of hard or frozen wheat, and soften the berry, so as to raise the quality of the flour, and facilitate the bolting of said flour.

It consists in introducing a jet of steam into the stream of descending wheat, and in the construction and combination of the parts of the apparatus by which this is accomplished.

A represents the hopper, into which the wheat is introduced from the smut-machine through the spout B. The hopper A is provided with a chute, C, and slide-gate D, by means of which the escape of the wheat from the hopper A is regulated at pleasure.

E represents a steam-boiler, which may be the ordinary steam-boiler by which the machinery of the mill is driven, or it may be an apparatus designed especially for generating steam for this purpose.

F are pipes leading from the boiler E to the hopper A, and which are provided with stop-cocks to shut off or regulate the admission of the steam, according to the requirements of the wheat to be operated upon.

The pipe or pipes F should be slightly inclined, so as to conduct the condensed steam back into the boiler. The forward end of the pipe or pipes F may be provided with a perforated shield, G, to divide the jet of steam, and also to protect the end or ends of the steam-pipe from the falling grain.

H is a spout, connected with the end of the pipe F, to receive the drip from the end of the said pipe F, and conduct it out of the hopper A.

By this means the berry may be softened, and the bran moistened and toughened, so that, when ground, the bran may be more easily and thoroughly separated from the flour, thus raising the quality of the flour from fifteen to twenty per cent.

Having thus described our invention, we claim as new, and desire to secure by Letters Patent—

The combination of the steam-pipe or pipes F, perforated shield G, and drip-pipe or pipes H, with the hopper A, substantially as herein shown and described, and for the purposes set forth.

L. J. ADAMS,
J. H. ESALE.

Witnesses:
THATCHER NICKERSON,
D. H. SMALL.